Jan. 2, 1945. R. K. ANNIS 2,366,470
ASTRONOMICAL INSTRUMENT
Filed July 22, 1940 2 Sheets—Sheet 1
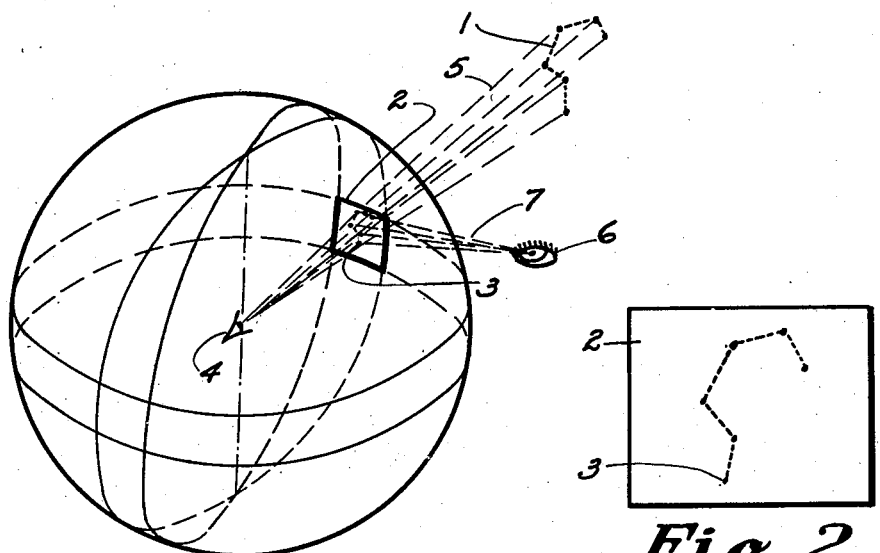
Fig. 1.
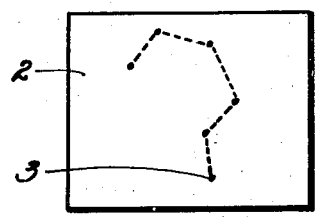
Fig. 2.
Fig. 3.
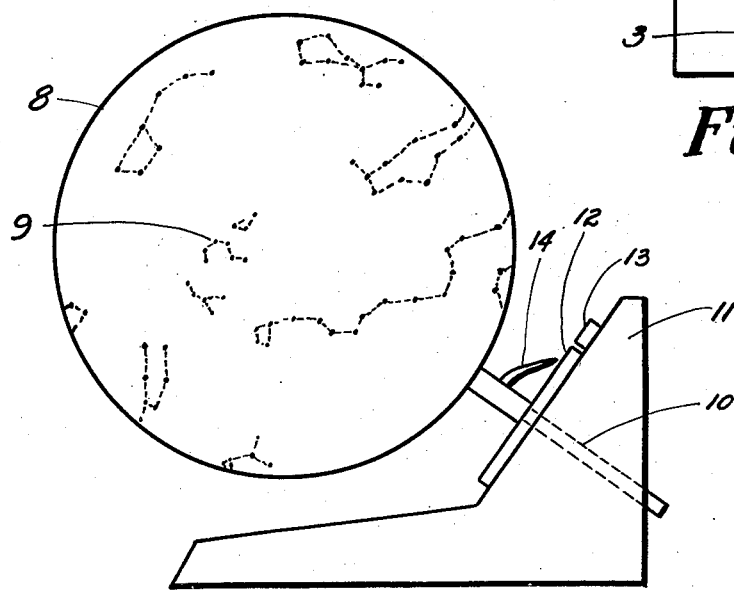
Fig. 4.
Inventor
Russell K. Annis Jan. 2, 1945.   R. K. ANNIS   2,366,470
ASTRONOMICAL INSTRUMENT
Filed July 22, 1940   2 Sheets-Sheet 2
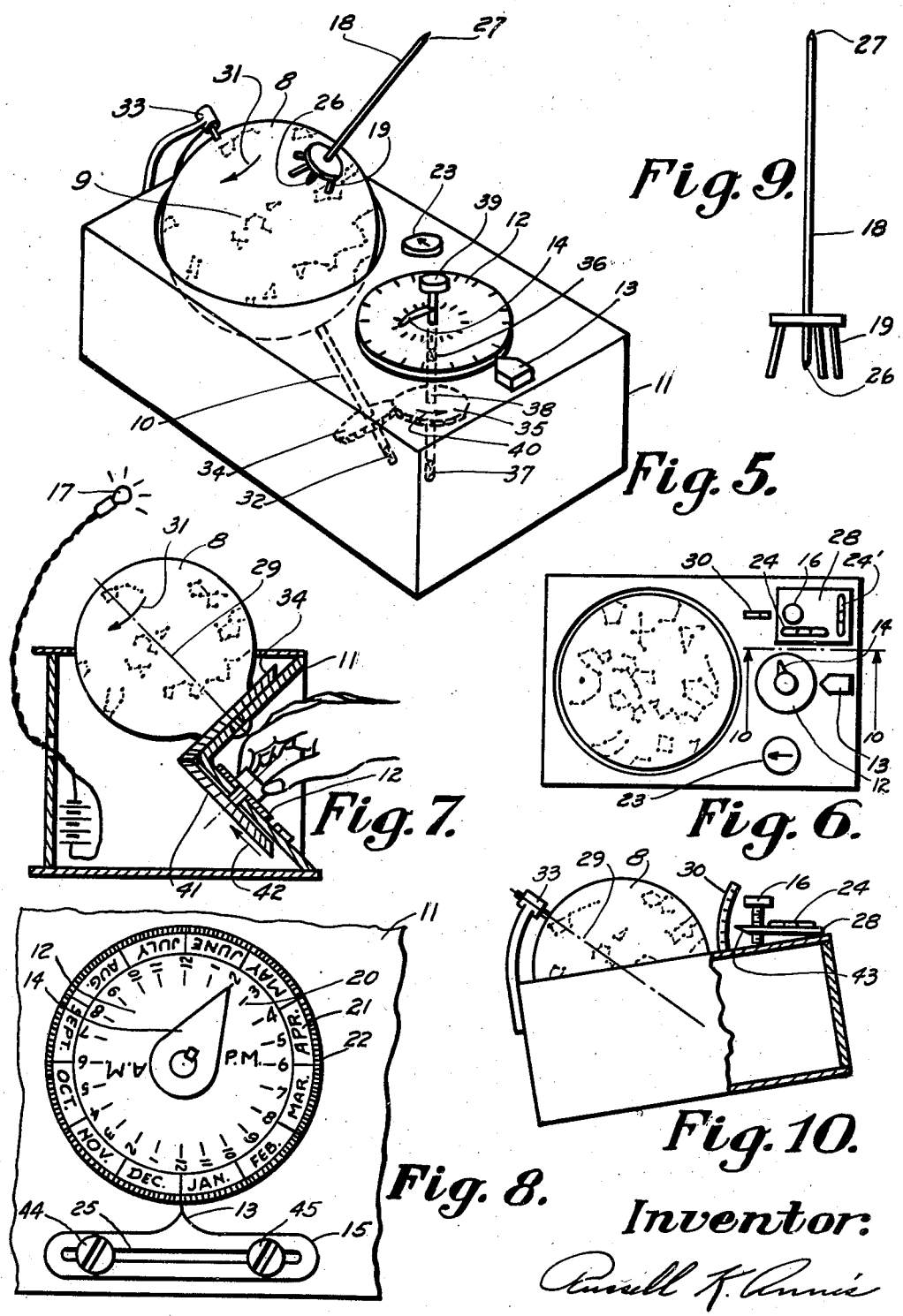
Inventor:
Russell K. Annis Patented Jan. 2, 1945

2,366,470

UNITED STATES PATENT OFFICE 2,366,470

ASTRONOMICAL INSTRUMENT

Russell K. Annis, Asheville, N. C.

Application July 22, 1940, Serial No. 346,794

13 Claims. (Cl. 35—47)

My invention is an instrument for locating or pointing out the stars, constellations, and other heavenly bodies by means of a globe on which these objects are plotted, which globe is orientated in relation to the fixed stars by means of a dial and gear mechanism in such a manner as to compensate for the daily rotation of the earth about its own axis and for the yearly motion of the earth around the sun.

I attain this object by means of the geometric principle and mechanism illustrated in the accompanying drawings in which—

Fig. 1 is a diagram showing the principle on which the objects on the globe are plotted; Fig. 2 is a card such as commonly used to locate constellations and containing holes to represent the component stars; Fig. 3 is a view of the reverse side of said card; Fig. 4 shows a globe mounted on a simple base, having constellations plotted on said globe; Fig. 5 is a pictorial view of a box in which a globe is mounted and actuated by means of a dial and gears; Fig. 6 is a top view of the box, globe, dial, and gears; Fig. 7 is an alternative construction; Fig. 8 is a plan view of the dial and the dial pointers; Fig. 9 is a sky pointer to be placed on the globe for convenience in showing the exact location in the sky corresponding to a given object seen on the globe; and Fig. 10 is a view partly in elevation and partly in section, as shown by the arrows marked 10—10 in Fig. 6 and illustrating the use of a hinged level for compensating for differences in the latitudes at which this device is used.

Similar numerals refer to similar parts throughout the several views.

Referring especially to Fig. 1, 1 is a constellation in the sky, which constellation is seen by an observer 4, looking at a card 2, which card has punched holes 3 for locating the stars in said constellation. Each hole in said card corresponds to a star in said constellation as indicated by the projected lines of sight 5. Said card is held by the observer at approximately arms length and said observer faces the front side of said card as shown in Fig. 2.

Now if the observer stands in position 6 and looks at the reverse side of said card along projection lines 7, the relative positions of the various stars will appear to be reversed as shown in Fig. 3.

This reversed principle is used in plotting the stars on globe 8, and said principle has an important relation to this invention, in that it might be imagined, without the use of this principle, that a complete hollow sphere could be plotted with the stars on the inner surface of said sphere similar to Fig. 1, whereon card 2 would be an incremental portion of said inner surface. This is the general arrangement along which large planetariums are built, but for the present purposes said arrangement would have the disadvantage that a globe large enough to completely enclose the observer would be required.

Globe 8, however, has the heavenly objects 9 plotted on its external surface, said objects being in reverse order, and for this reason said globe can be constructed to any convenient scale. A globe 10 inches in diameter, for example, can easily be carried into any home or schoolroom, when desired, or it can be taken outdoors for making stellar observations.

The simplicity of this device can readily be seen from the drawings. By following very simple instructions, either in oral or written form, a child of grammar school age can learn to find stars in a few minutes. The presence of the rotatable celestial globe 8 will excite the child's interest, and the very fact that the globe rotates will demonstrate to him the fact that the stars in the sky similarly appear to rotate. The manner of operating the dials and pointers is as simple as the dialing of a radio set, and the relationship between time and stellar motion is instantly apparent. It is one of the objects of this invention to bring home to a child, or student of any age, this relationship between time and stellar motion, and to place in his hands a means for locating for himself, either indoors or outdoors, the actual location of the stars, simultaneously with their inter-relationships as constellations, without the use of any kind of reference tables, books, maps, or globes, and without the use of any mathematical calculations whatsoever. It can be used either for educational purposes, or for amusement or entertainment.

Shaft 10 is non-rotatably fastened to globe 8 and is rotatably mounted in base 11; hour pointer 14 is fastened to shaft 10; and globe 8 is turned by hand until hour pointer 14 registers with the time of day as shown by the divisions and numbers 20 on dial 12. Dial 12 is rotatably mounted on shaft 10; and said dial, previous to adjusting hour pointer 14 to the time of day, is turned into such a position that date pointer 13 registers with the correct month 21 and the day of the month 22 as indicated by graduations on dial 12.

A preferred form of the invention is shown in Figs. 5, 7, and 10, wherein globe 8 is positioned in base 11 in such a manner as to conceal substantially half of said globe. This manner of positioning the globe has a much greater similarity to the actual outdoor sky than a complete globe or sphere would have, especially when viewed by a novice in astronomical science. By concealing substantially half of the globe, the remaining half which is revealed is still capable of rotating on axis 29, and a very realistic illusion is thus created. The base remains stationary, and the stars appear to rise and set as the globe is rotated.

Dial 12 is thus, in effect, a simple form of adding device in that it adds the angular motion of the earth around the sun as indicated by month graduations 21, and date graduations 22, to the angular motion of the earth about its own axis as indicated by hour graduations 20. Graduations 20 are numbered from 1 to 12 a. m. and from 1 to 12 p. m. making 24 equal divisions corresponding to the 24 hours of the day. These divisions are subdivided into fractions of an hour for greater accuracy. Graduations 22 are 365 divisions corresponding to the 365 days of the year and these divisions can be either equal or unequal according to whether it is desired that they shall compensate for the non-uniform velocity of the earth in its motion around the sun, and for the obliquity of the ecliptic. These day graduations 22 are then grouped into months 21 according to whether a given month contains 30, 31, or 28 days. Wherever suntime is used for adjusting hour pointer 14, equal divisions on graduations 22 will be correct. Wherever clocktime is used, equal divisions on graduations 22 will cause an error, at times, varying from zero up to approximately plus or minus sixteen minutes of time. This is the equivalent of approximately 4 degrees of arc or approximately 4 days plus or minus on the day graduations 22. By laying out graduations 22 in unequal divisions, and in such a way as to compensate for this error, the accuracy of this device will be improved.

This instrument, if correctly built in accordance with the above description, is correct for the exact center of any given time zone, and it is therefore approximately correct for any part of any time zone. However, for a more accurate instrument an alternative form of this invention is shown in Fig. 8. In this form of the invention, date pointer 13 is not fastened directly to base 11 as illustrated in Fig. 5, but it is either made integral with, or attached permanently to, slotted part 15, which part 15 is adjustably fastened to base 11, as shown in Fig. 8. Part 15 contains a slot 25 and screws 44 and 45. Said screws are threaded into base 11, and serve to guide part 15. After part 15 is so adjusted as to place pointer 13 in correct relation with months scale 22, hour scale 20, pointer 14, together with globe 8 and the gear mechanism above described, said screws are tightened so as to prevent further accidental movement of slotted part 15 and pointer 13.

Two other methods are shown for actuating the position of the globe. In Fig. 5, globe 8 is fastened to shaft 10 which turns on bearings 32 and 33. Gear 34 is fastened to shaft 10 and said gear engages with gear 35. Gear 35 is fastened to shaft 38 which shaft is rotatably mounted in bearings 36 and 37 and turned by means of knob 39. Hour pointer 14 is fastened to shaft 38 and points to dial 12 in the same manner as pointer 14 shown in Fig. 4. Globe 8 is represented in Fig. 5 as though revolving from east to west, as indicated by arrow 31; and due to the action of gears 34 and 35 pointer 14 would be turned in a counterclockwise direction as indicated by arrow 40. For this reason, when the mechanism shown in Fig. 5 is used, the direction of the numbering of the hours 20 and the months 21 and the days 22 would be reversed from that shown in Fig. 8. This is indicated by the arrow 40.

With the arrangement shown in Fig. 7, gear 41 meshes with the lower teeth of gear 34 and turns in direction 42 when globe 8 turns in direction 31. With this mechanism, dial 12 is graduated into months, days, and hours as shown in Fig. 8.

23 is a directional compass by means of which shaft 10 is orientated into a northerly direction.

Members 24 and 24' are spirit levels set at right angles to each other. These levels are mounted in a hinged sub-base 28, which sub-base is adjusted by means of a thumb screw 16 until latitude pointer 43 indicates the latitude on scale 30. Thus, by means of compass 23 and levels 24 and 24', axis 29 of the globe is brought into parallel relation with the axis of the earth.

17 is a small electric light for lighting globe 8 when used outdoors in the darkness.

After all adjustments are made, any desired object on globe 8 can be located in the sky by means of sky pointer 18. Said sky pointer is sharpened at ends 26 and 27 in order to distinguish clearly what star on globe 8 and what star in the sky is being pointed out by the respective ends 26 and 27. Said sky pointer has three legs 19 fixed to the lower end. These three legs are ordinarily of equal length, and are spaced around sky pointer 18 at equal intervals, so that the lower ends of said legs form the apexes of an equilateral triangle. Thus sky pointer 18 is located centrally with respect to the lower ends of the three legs, and at right angles to the plane of the equilateral triangle which they define. The sky pointer, together with the three attached legs, is held by hand, or in any other convenient manner, against the surface of globe 8 as illustrated in Fig. 5. When held in this manner, the plane of the equilateral triangle intersects the surface of the sphere. According to well known geometrical theorems, this intersection is a small circle, and a line drawn from the center of said small circle, at right angles to the plane of the circle, passes through the center of the sphere, globe 8. For this reason, the sky pointer, which is also centrally located with respect to this small circle, because it circumscribes aforesaid equilateral triangle, lies on the radial line defined by the star and the center of the sphere. The sky pointer will therefore, when so held, point to the star in the sky by means of its outer end 27, which star is represented by its corresponding indicium on the surface of globe 8 and located at end 26 of sky pointer 18.

It is assumed in all of the above that certain heavenly objects have been plotted in their correct respective positions on globe 8 and that said globe has been properly synchronized with dial 12.

I claim:

1. In an astronomical instrument, a globe, said globe being rotatably mounted in a base, the upper end of the axis of said globe intersecting the surface of said globe at a point corresponding approximately to the North Star, and dots plotted on the surface of said globe adapted to represent stars, in combination with a mechanism for rotating said globe, said mechanism consisting of a pointer permanently connected by means of gears to said globe and fixed to a shaft, the axis of said shaft extending through the center of a dial, and said dial having markings for indicating the position of said pointer, said markings being equally spaced radially about said axis and corresponding to the 24 hours of the day and said dial being rotatable about said axis and having a second set of markings about its outer rim, said second set of markings corresponding to the days of the year together with a fixed pointer registering with said second set of markings and indicating the position of aforesaid dial.

2. The combination of a base, a globe rotatably supported by said base, and a rotatable pointer permanently geared to said globe, together with a disc, said disc being rotatable about the axis of said pointer and having a circular scale registering with said pointer, said disc also having a second scale, said second scale registering with a second pointer, said second pointer being supported by aforesaid base.

3. The combination of a base, a globe rotatably supported by said base, and a rotatable pointer permanently geared to said globe, together with a disc, said disc being rotatable about the axis of said pointer and having a circular scale registering with said pointer, said disc also having a second scale, said second scale registering with a second pointer, said second pointer being supported by aforesaid base, and a leveling device adapted to show degrees of latitude attached to said base.

4. In an astronomical instrument, a celestial globe, in combination with a base, and a leveling device attached to said base, said leveling device having a pointer and a scale, said scale being non-rotatably fastened to said base and having markings adapted to show degrees of latitude, and said pointer being hinged to said base and containing a leveling means for placing said pointer in a horizontal position; said leveling device thus constructed constituting a means whereby the angular position of the axis of said celestial globe with respect to a horizontal plane can be so corrected as to compensate for differences in latitude on the earth's surface, at which said latitude said celestial globe is used.

5. The combination of a globe and sky pointer, said sky pointer consisting of a rod, one end of said rod having means adapted to cause said rod to assume a radial position whenever said sky pointer is placed in contact with the surface of said globe.

6. In an astronomical instrument, a base, a globe rotatably supported by said base, said base containing a recess, and said recess concealing approximately half of said globe, combined with a dial and pointer and a means adapted to cause said globe to be rotated in a fixed relation to the movements of said dial and pointer, also combined with a sky pointer, said sky pointer consisting of a rod, one end of said rod having means adapted to cause said rod to assume a radial position whenever said sky pointer is placed in contact with the surface of said globe.

7. The combination of a globe and sky pointer, said sky pointer consisting of a rod, together with at least three legs attached to one end of said rod and arranged in the manner of a tripod, thereby causing said rod to assume a radial position whenever said legs are placed in contact with said globe.

8. In an astronomical instrument comprising a rotatable globe bearing indicia representing celestial bodies the combination of a dial, said dial bearing indicia constituting a year time scale whereby the months and portions of a month may be indicated, and said dial having a second set of indicia constituting a day scale whereby hours and portions of hours may be indicated; a base, said base rotatably supporting said globe; a pointer supported by said base and registering with one of said scales, a second pointer operatively connected to said globe and registering with the other of said scales; whereby in two operations the indicia representing celestial bodies may be brought into correct radial apposition with the actual celestial bodies represented by said last named indicia.

9. An instrumentality as in claim 8 characterized in that the indicating mechanism is located substantially opposite the ruling polar star of said globe.

10. In an astronomical instrument comprising a rotatable globe bearing indicia representing celestial bodies the combination of a dial element bearing indicia constituting a year time scale whereby the months and portions of a month may be indicated, and said dial element having a second set of indicia constituting a day scale whereby hours and portions of hours may be indicated; and operative connections between said dial mechanism and said rotatable celestial globe; whereby in two operations the indicia representing celestial bodies may be brought into correct radial apposition with the actual celestial bodies represented by said last named indicia.

11. An instrumentality as in claim 10 characterized in that the indicating mechanism is located substantially opposite the ruling polar star of said globe.

12. In an astronomical instrument comprising a rotatable globe bearing indicia representing celestial bodies, and a base adapted to support said globe, the combination of a dial and pointer element, said dial and pointer element being adapted to indicate the rotative position of said globe; and said dial and pointer element being located substantially opposite the ruling polar star of said globe; and operative connections between said globe and said dial and pointer element.

13. An astronomical instrument including a rotatable globe bearing indicia representing celestial bodies, a base adapted to support said globe, a manually operable shaft operatively connected with said globe for rotating the same, a dial mounted for rotary movement on said shaft and bearing indicia constituting a year time scale whereby the months and portions of a month may be indicated, said dial having a second set of indicia constituting a day scale whereby hours and portions of hours may be indicated, a pointer supported by said base and registering with the year time scale of said dial, and a second pointer mounted on said shaft and registering with the day scale, whereby in two operations indicia representing celestial bodies may be brought into correct position with relation to the actual celestial bodies represented by the indicia on the globe.

RUSSELL K. ANNIS.